(12) United States Patent
Gruber

(10) Patent No.: US 8,675,007 B2
(45) Date of Patent: Mar. 18, 2014

(54) SYSTEM AND METHOD FOR HIGHER LEVEL FILTERING BY COMBINATION OF BILINEAR RESULTS

(75) Inventor: Andrew Gruber, Arlington, MA (US)

(73) Assignee: ATI Technologies ULC, Markham, Ontario (CA)

( * ) Notice: Subject to any disclaimer, the term of this patent is extended or adjusted under 35 U.S.C. 154(b) by 2532 days.

(21) Appl. No.: 11/163,142

(22) Filed: Oct. 6, 2005

(65) Prior Publication Data

US 2007/0080972 A1 Apr. 12, 2007

(51) Int. Cl.
*G09G 5/00* (2006.01)

(52) U.S. Cl.
USPC ......................................................... 345/582

(58) Field of Classification Search
None
See application file for complete search history.

(56) References Cited

U.S. PATENT DOCUMENTS

| | | | | |
|---|---|---|---|---|
| 6,130,674 A | * | 10/2000 | Vaswani et al. | 345/586 |
| 6,181,347 B1 | * | 1/2001 | Devic et al. | 345/586 |
| 7,002,591 B1 | * | 2/2006 | Leather et al. | 345/582 |
| 2007/0008333 A1 | * | 1/2007 | Xu | 345/582 |

\* cited by examiner

*Primary Examiner* — Aaron M Richer
(74) *Attorney, Agent, or Firm* — Faegre Baker Daniels LLP

(57) ABSTRACT

A method and system for higher level filtering uses a native bilinear filter, typically found in a texture mapper, and combines a plurality of bilinear filter results from the bilinear filter to produce a higher level filtered texel value. A native bilinear filter is operative to generate bilinear filtered texel values by performing a plurality of bilinearly filtered texture fetches using bilinear filter fetch coordinates. The method and system combines the plurality of bilinear filtered texel values with a plurality of weights to generate the higher level filtered texel value.

17 Claims, 6 Drawing Sheets

SYSTEM AND METHOD FOR HIGHER LEVEL FILTERING BY COMBINATION OF BILINEAR RESULTS

FIELD OF THE INVENTION

The present invention relates generally to graphics image processing and more specifically to improved higher level filtering.

BACKGROUND OF THE INVENTION

In a graphics processing environment, image filtering allows for improved image quality in a rendered display. Two common filtering approaches are a multi-tap filter which is used for high-quality video or anti-aliased text and pixel shader code and two by two (bi-linear) filtering for a texture maps. Bilinear filters adjust the color of a pixel by computing a weighted average of a 2×2 array of texels that lie nearest to the center of the calculated pixel. The weighted average color is then assigned to the pixel. Multi-tap filters are generally expensive in terms of not only components for performing these operations, but also in processing time. A multi-tap filter complicates a standard graphics processing pipeline through requiring further processing steps and extended computation time.

A typical three-dimensional graphics processing system natively provides a two-by-two bilinear filter. A single address fetch by the filter results in 4 texels being returned. When an application requires a higher level of taps (higher level filtering), such as a 4×4 filter, this native bilinear filter is inadequate.

A solution to overcome the limitations of the native bilinear filter is utilizing pure pixel shader code. In this embodiment, a pixel shader that includes one or more ALUs includes specific code, such as executable instructions operated on a graphics processing unit, that performs the filtering functionality. In any situation where scaling occurs, such as the source and destination are not the same size or the output pixel does not align exactly to input texels, different weight sets are needed to compensate for the possible different sub-pixel alignments. Utilizing pixel shader code is generally slow because, among other things, two texture fetches are needed for each tap, one fetch is needed to fetch the weight of the texel value and one fetch is needed to fetch the texel value to be weighted. Furthermore, using pure pixel shader code, typically only "pick nearest" filtering can be used by the texture fetches, meaning that only one texel is returned for each fetch request and another 16 fetches can be required for the corresponding weights for a total of 32 fetches. It will be recognized that if a weight applies equally to four texels, fewer weight fetches may be needed (e.g., perhaps only four fetches to obtain the weights for 16 texels) however, the total number of fetches may still be unnecessarily high.

When enlarging an image, the filtering allows scaling the image and thereby creating more pixels between input texels. The quality of the scaling is largely determined by the width and height of the filter footprint. Increasing the number of taps, i.e. samples, directly increases the image quality.

Therefore, there exists a need for an improved graphics processing system allowing for higher level filtering without extensive processing overhead costs, such as by using fewer fetches utilizing existing system resources.

DETAILED DESCRIPTION OF A PREFERRED EMBODIMENT

Figure 1:
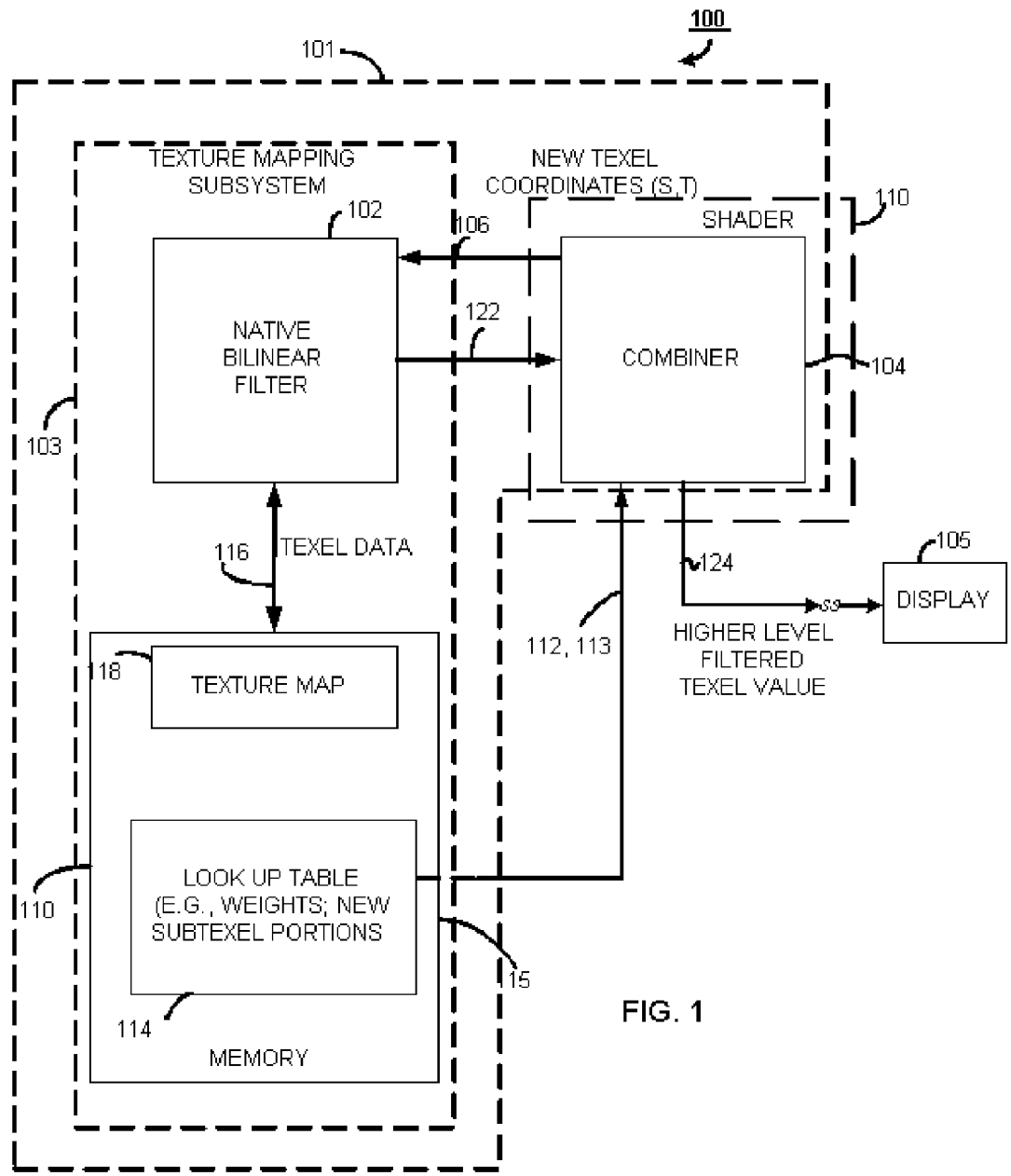
FIG. 1 illustrates a system for higher level filtering using bilinear results in accordance with one embodiment of the present invention.

Generally, the present invention includes a method and system for higher level filtering that uses a native bilinear filter and combines a plurality of bilinear filter results from the bilinear filter to produce a higher level filtered texel value. The bilinear filter may be a bilinear filter found within a standard graphics processing system or the bilinear filter may be any suitable filter natively disposed within any graphics processing system or circuit, subsystem or system. For purposes of illustration only, and not limitation, the invention will be described with reference to texels and sub-texel portions although it will be recognized that the invention is also applicable to pixels and sub pixel portions and associated pixel operations (e.g. generating a filtered pixel).

In one embodiment, a graphics processing system that includes a texture mapping subsystem employs a higher level filter for image processing using fewer fetches. The higher level filter includes one or more bilinear filters located within a texture mapping subsystem. A combiner receives bilinear filtered texel values from the bilinear filter and is operative to combine the plurality of bilinear filtered texel values and corresponding weights to produce a higher level filtered texel value. A method is also disclosed which includes sending a texel coordinate to one or more bilinear filters, receiving from the bilinear filters a plurality of bilinear filtered texel values in response to the sending of the texel coordinates and combining the received bilinear filter texel values with weights in order to generate the higher level filtered texel value. For example, when processing an image based on graphics information, texels are fed into a bilinear filter and the outputs from the bilinear filter are weighted and combined to produce a higher level filtered texel value. The texel value may then be processed further or displayed on a suitable display as part of the image.

In one embodiment, the present invention includes receiving an initial texel fetch coordinate, such as (S, T) texels coordinates where, for example, the S and T texel coordinate may each include a texel portion (e.g., that points to a stored texture), such as an integer portion (denoted (Sint, Tint)) and a subtexel portion, such as a fractional portion, as known in the art. Corresponding weights may be generated using the sub-texel portion, denoted as (Sfract, Tfract), of the texel coordinate (S, T). The present invention includes generating a plurality of new sub texel portions from the sub texel portion of the initial texel fetch coordinate. Similarly, the method includes generating a plurality of new texel portions from the texel portion of the initial texel fetch coordinate. These plurality of new texel portions and subtexel portions that are all based on the initial texel fetch coordinate, are used to generate a new set of bilinear filter fetch coordinates that are used by a native bilinear filter (e.g., four new sets of (S, T)). For example, the new set of S, T bilinear filter fetch coordinates are generated for surrounding texels by the original coordinates being broken into integer portions, e.g. (Sint−1, Tint−1), (Sint−1, Tint), (Sint, Tint−1), (Sint, Tint). The corresponding new subtexel portions are generated from the original subtexel portions via table look-up. In one embodiment, 4 new Sfract values may be looked up using the original Sfract value via a 1D texture fetch. Similarly the 4 new Tfract values may be generated via a separate 1D texture fetch. The new texel portions and new subtexel portions are then combined to form 4 new (S, T) addresses.

The present invention performs 4 bilinear filter operations in an exemplary embodiment of a 4×4 filter. For each group of 2×2 texels that contribute to the filter, the present invention generates a texel address (S, T), wherein these addresses may be used as input to the bilinear filter. The bilinear filter performs standard bilinear filter operations using the texel addresses.

A plurality of bilinearly filtered texel values, such as TexelQ0 through TexelQ3 may be generated by the bilinear filter, using well known bilinear filter operations. The present invention further includes combining the plurality of bilinearly filtered texel values with the plurality of corresponding weights to generate a higher level filtered texel value. Therefore, the higher level filtered texel value is generated using a reduced number of texture fetches through the utilization of the native bilinear filter compared to using a shader that requires per texel fetching when carrying out a 4×4 higher level filter operation.

More specifically, FIG. 1 illustrates a system 100 that includes a higher level filter 101 that includes filter logic, such as a texture mapping subsystem 103 and a combiner 104. The system 100 may be any suitable system that employs a graphics processing system, such as a graphics processor or other suitable graphics processing circuitry. The system 100 may include, for example, a device or apparatus that employs the graphics processing system such as, but not limited to, a handheld cellphone, a camera, printer, set top box, laptop computer, desktop computer, handheld computing device, or any other suitable device or system. As such, the system 100 may or may not include a display 105 that eventually displays a higher level filtered value produced by the disclosed higher level filter 101. The texture mapping subsystem 103 includes a native bilinear filter 102 and texture map 118. The combiner 104 may be any suitable type of processing device as recognized by one having ordinary skill in the art and in one embodiment of the present invention, the combiner 104 is disposed within a shader 110 of a graphics processor. It will be recognized that any suitable structure or processor may be used. The processor may be, but is not limited to, a single processor, a plurality of processors, a DSP, a microprocessor, ASIC, state machine, or any other implementation capable of processing and executing software or firmware. The term processor should not be construed to refer exclusively to hardware capable of executing software, and may implicitly include DSP hardware, ROM for storing software, RAM, and any other volatile or non-volatile storage medium. The native bilinear filter 102, in this example, fetches a 2×2 "quad" of texels based on a received new bilinear filter fetch coordinate 106 determined and provided by the shader 110 via a table look up, in this example. In one embodiment, the new bilinear filter fetch coordinate 106 may be referred to as (S, T) coordinates having new sub-texel portions that may be designated as (Sfract, Tfract). In one embodiment the new bilinear filter fetch coordinate 106 may be received from the shader 110, and in particular from the combiner 104 within the shader. The combiner 104 is operative to access, using texture fetch logic as known in the art, the look-up table 114 in memory 115 (in this example a texture map in memory), containing weight values therein and the new subtexel portions to generate the new sub-texel coordinates. The new subtexel portions are generated in this example by looking them up in the LUT 114 based on the initial subtexel portion that is part of the initial bilinear filter fetch coordinate. Alternatively, instead of using a look up table, the combiner 104 may calculate the weights and new subtexel portions as needed.

The combiner 104 is operative to determine a plurality of new sub-texel portions 112 based on sub-texel portions of the initial texel coordinate, such as locations (Sfract, Tfract). In one embodiment, the sub-texel coordinates may be referred to as (BifractSQ0, BifractTQ0) through (BifractSQ3, BifractTQ3) for an exemplary four by four pixel array.

In the exemplary embodiment of the four by four pixel array, the shader 110 utilizes the texel address (S, T), which points into the middle of a texture grid that is the subject of filtering. From initial (S, T), the present invention creates four new S, T coordinates, referred to as new bilinear filter fetch coordinates 106 as they are used for the bilinear filter to fetch texel information for filtering, which each refer to a two by two block of the sixteen texel block. The present invention generates weighting, in this example by obtaining weights 113 (see FIG. 6) by using a look up table 114 to apply to the results of the bilinear filter.

In one embodiment, the combiner 104 is disposed within the shader 110, such as a pixel shader. The combiner 104, in accordance with executable instructions, generates a higher level filtered value 124 based on the combination of the weights and the bilinear filtered texel values 122 from the native bilinear filter 102.

In one embodiment, the plurality of bilinear filtered texel values are combined with the weight values to generate a higher level filtered texel value, wherein this operation may be performed by the combiner 104 within the shader 110. The higher level filtered texel value may be computed based on the addition of the combination of corresponding weights and bilinear filtered texel values. For example, in an exemplary embodiment of a four by four pixel array, the higher level filtered value 124 may be determined based on Equation 1.

$$\text{Higher Level Filtered Value} = (\text{Weight}Q0 * \text{Texel}Q0) + (\text{Weight}Q1 * \text{Texel}Q1) + (\text{Weight}Q2 * \text{Texel}Q2) + (\text{Weight}Q3 * \text{Texel}Q3)$$

Equation 1:

The present invention generates the higher level filtered texel value 124 using a significantly reduced number of computations. In the exemplary embodiment of the four by four array, a reduced number of fetches are utilized to generate the addresses for the bilinear fetch, four fetches for each of the Sfract, four fetches for each of the Tfract, four fetches for each of the weights Q, and 4 fetches for bilinear fetch. In one embodiment, the present invention utilizes a 4:1 encoding efficiency based on ARGB packing, as discussed in greater detail below.

Therefore, the present invention provides for a total of 8 fetches for the Sfract and Tfract (address generation), 4 fetches of the native bilinear filter and 4 fetches for Weight fetches, as compared to a total of 16 fetches for the pick-nearest version of fetching taps plus 16 weight fetches. Using packed weights optimization, weight fetches and fetches for Sfract, Tfract are reduced by a factor of four to generate 7 total fetches versus 20 fetches in normal approach using optimized packing of ARGB format. In relation to ALU operations—the prior approach requires at least sixteen computational operations to combine weight times tap and accumulate the results.

The present invention requires only four ALU operations to combine weight times filter tap and accumulate the results by the combiner 104. As recognized by one having ordinary skill in the art, the fetching operations may be performed relative to any suitable memory device, such as a look-up table or any other suitable memory location.

Figure 2:
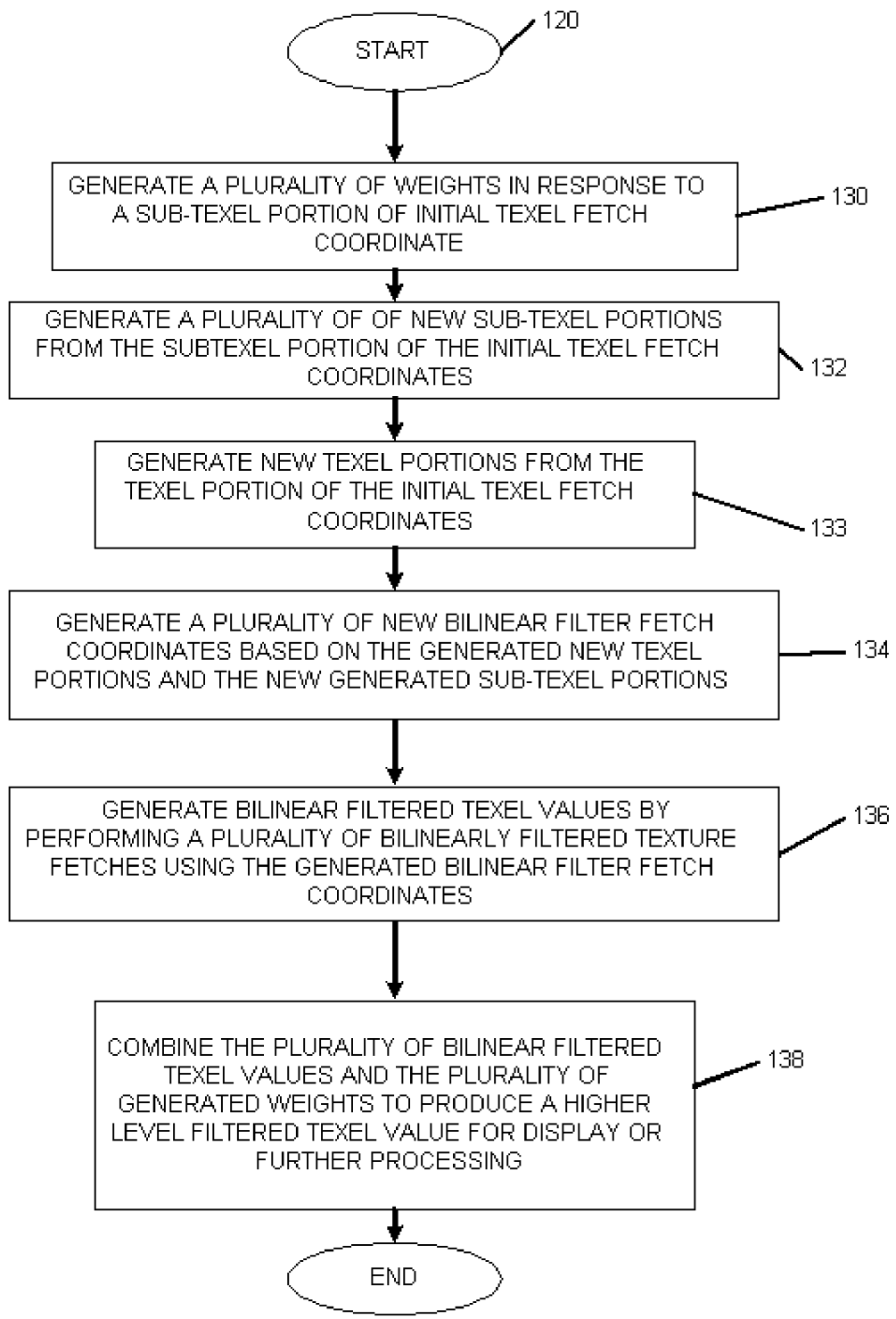
FIG. 2 illustrates a flowchart of the method for higher level filtering using bilinear results in accordance with one embodiment of the present invention.
Figure 3:
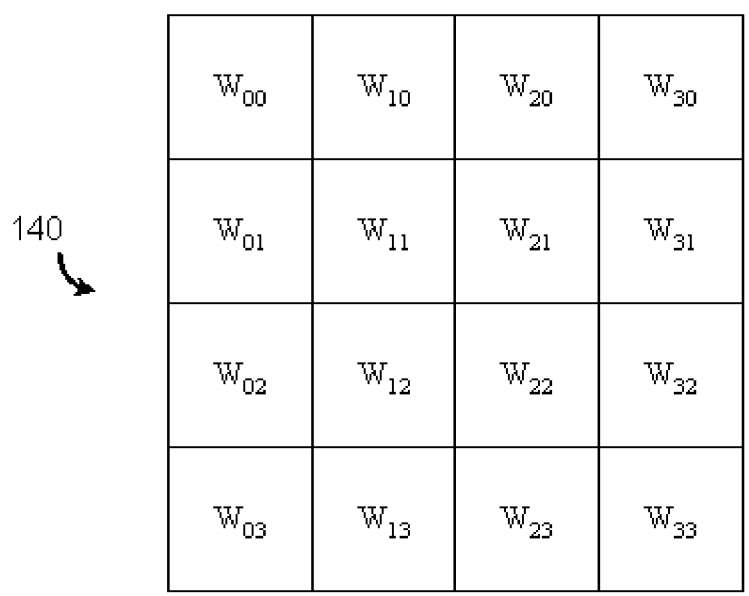
FIG. 3 illustrates a graphical representation of a 4×4 weighted matrix array.

FIG. 2 illustrates a flowchart of the steps of one embodiment of a method for higher level bilinear filtering. The method begins by generating a plurality of weights in response to a sub-texel portion of an initial texel fetch coordinate, step 130. In one embodiment, the weights are determined based on a positioning relative to texel values. For example, the combiner 104 of FIG. 1, in response to the received texel values 106, determines a plurality of weight values, such as using a predetermined lookup table 114. In one exemplary embodiment in a 4×4 matrix array, FIG. 3 illustrates a weighted matrix 140 having a plurality of weight factors, W00-W30, W10-W30, W02-W32 and W03-W33. In one embodiment, a horizontal ratio and a vertical ratio may be determined based on a relationship between the weights, as discussed below.

With the combiner 104, the next step of the method is generating a plurality of new subtexel portions from the sub-texel portion of the initial texel fetch coordinate, step 132. As shown in block 133, the method includes generating a plurality of new texel portions from the texel portion of the initial texel fetch coordinate. Step 134 is generating a plurality of new bilinear filter fetch coordinates using the plurality of generated sub-texel portions in combination with generated plurality of texel portions. For example, if the generated sub-texel portions are defined as (BiFractSQ0, BiFractTQ0) through (BiFractSQ3, BiFractTQ3) and the generated texel portions are defined as (Sint−1, Tint−1) through (Sint+1, Tint+1), the new bilinear filter fetch coordinates would be (Sint−1+BiFractSQ0, Tint−1+BiFractTQ0), (Sint+1+BiFractSQ1, Tint−1+BiFractTQ1), (Sint−1+1 BiFractSQ2, Tint+1+BiFractTQ2) and (Sint+1+BiFractSQ3, Tint+1+BiFractTQ3).

Step 136 is generating a plurality of bilinear filtered texel values (e.g., each bilinear filtered texel value is generated from each fetch coordinate) by performing a plurality of filtered texture fetches using the generated bilinear filter fetch coordinates. In one embodiment, the fetching is performed from the texture map 118 using the bilinear filter fetch coordinates generated in step 134. Step 138 is combining the plurality of bilinear filtered texel values and the weights, using combining logic such as an arithmetic logic unit, to generate a higher level filtered texel value. The higher level filtered texel value 124 is computed as the compilation of multiple calculated bilinear filtered texel values, wherein previously calculated bilinear filtered texel values may be calculated using the above-noted steps of the present invention. In one embodiment, the previously calculated values may be stored within a temporary register connected to or disposed within the combiner 104 of FIG. 1. The higher level filtered texel value 124 is thereupon provided for further graphics processing in accordance with a pixel processing pipeline or output for display if desired. As there is a significant reduction in the amount of computation required, there is a reduction in the amount of subsequent computations.

The present invention generates a similar output as prior art techniques, but provides for the generation of this similar result using a reduced number of fetching and processing operations. The present invention allows for the generation of one or more equations to simulate weights for a given a sub-texel position, e.g. (W00-W03, W30-W33) table of FIG. 3, and texture coordinates (S0, T0)-(S3, T3) in the exemplary four by four matrix array. The present invention utilizes an initial pointer to initial texture coordinates (Sint, Tint), otherwise referred to as the integer portions which point to an exact texel. The present invention further utilizes the fraction portion (Sfract, Tfract), which is the offset value. A basic pick-nearest approach, fetches pixel as Sint−1, Tint−1 times W00, fetches texel Sint, Tint−1 times W01, for all sixteen pixel in the exemplary four by four matrix array. The prior techniques also therein compute sixteen weights multiplied by sixteen texel fetches.

The present invention utilizes data manipulation to achieve efficient computation and fetching operations. As discussed below, based on data manipulation, the similar result of bilinear filter operations may be more effectively performed using the present invention in conjunction with the below-noted equations.

Figure 4:
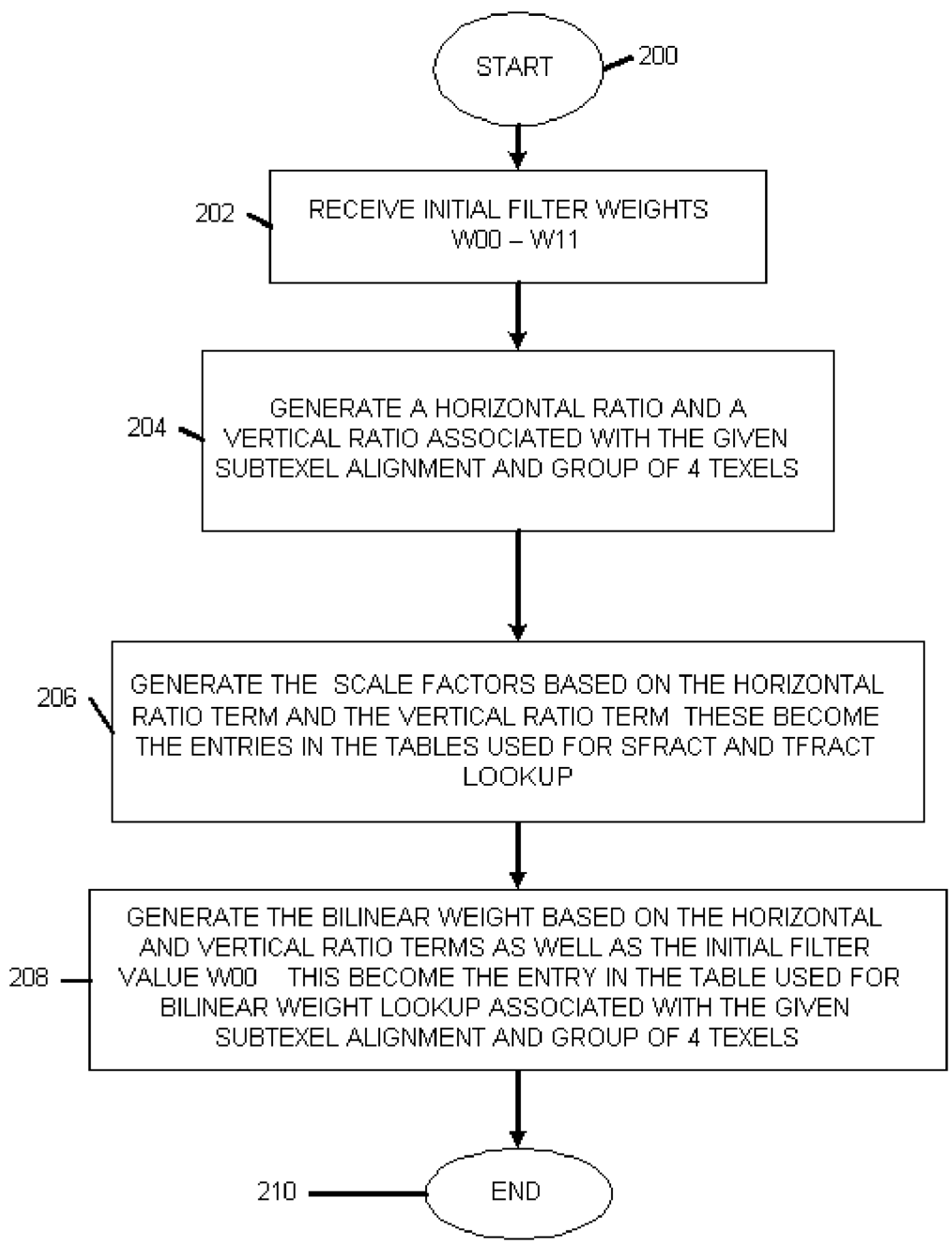
FIG. 4 illustrates another flow chart of a method for pre-computing values used by the present invention.

More specifically, in one embodiment through the utilization of the bilinear filter, FIG. 4 illustrates a method of an exemplary calculation of the lookup table values used for a single bilinear fetch in the present invention. The method begins 200 by receiving a plurality of initial filter weights (W00-W11) step 202. These initial weights are associated with a particular sub-texel alignment and would be the values to be used to multiply pixels P00 through pixels P00 in the known art.

Step 204 is generating new Sfract, Tfract values that will be placed in the look-up table for that particular sub-texel alignment. The look-up table values are based on the horizontal ratios and the vertical ratios of the initial filter weights. In one exemplary embodiment, FIG. 3 illustrates a plurality of weights. Step 206 is generating the scale factors using the horizontal ratios and the vertical ratios.

In one embodiment, the horizontal ratio can be determined based on the fraction of a first weight and a second weight in a horizontal relationship, such as the relation of W00 and W01 of FIG. 3.

$$W00/W10 = W01/W11 = \text{horizontal ratio} \qquad \text{Equation 2:}$$

The vertical ratio is further computed based on the spatial relationship between the various weights in a vertical relationship, such as the quotient or fraction of W00 and W10 of FIG. 3.

$$W11/W12 = W21/W22 = \text{vertical ratio} \qquad \text{Equation 3:}$$

The horizontal ratio is applicable to all relative weights in a horizontal relationship and the vertical ratio is relative to all weights in a corresponding vertical relationship. Moreover, this ratio relationship exists for all filters that are separable.

Step 206 is generating the 'fraction factors' that are the entries in the Sfract and TFract lookup tables. For example, the first fraction factor is generated as the ratio of the horizontal ratio divided by the sum of 1 plus the horizontal ratio and the second fraction factor is the vertical ratio divided by the sum of 1 plus the vertical ratio.

$$\text{First fraction:} Sfract = (h\_ratio/(1+h\_ratio)) \qquad \text{Equation 4:}$$

$$\text{Second fraction:} Tfract = (v\_ratio/(1+v\_ratio)) \qquad \text{Equation 5:}$$

Step 208 is generating the new bilinear filter weight, WeightQ0. Normalizing the first and second fractions in the accompanying x and y directions provides that, in one embodiment, WeightQ0 may be calculated as noted in Equation 6.

$$W00*(1+h\_ratio)(1+v\_ratio) \qquad \text{Equation 6:}$$

In one embodiment, the combined bilinear term and scale factor may be represented as equation 7 based on the vertical ratio, the horizontal ratio, the first fraction factor and the second fraction factor.

$$W00*(1+h\_ratio)(1+v\_ratio)*[[((p00*(1-Sfract)+\\p10*Sfract)*(1-Tfract)]+(p01*(1-Sfract)+\\p11*Sfract)*Tfract)]$$ Equation 7:

Equation 7 represents the resulting value after the bilinear filtering and multiplication of the bilinear weight for the quad of texels in the upper left of the sample region. For a full higher level filter, Equation 7 is repeated for each of the 2×2 regions in the sample region, combining the results. The bilinear weights and replacement Sfract, Tfract associated with the different 2×2 regions in the sample region are computed in a similar manner to that shown above, simply using the set of initial weights associated with the respective region. The first computational element of Equation 7, (W00*(1+h_ratio)(1+v_ratio)), may be pre-computed as described above and stored in a look-up table such that this element may be retrieved as a bilinear weight and does not to be repetitively computed. Similarly the Sfract and Tfract terms may be pre-computed and looked up. Furthermore, bracketed term of equation 7 represents the math done by the native bilinear filter if Sfract and Tfract are provided as the sub-texel portions of the texel address.

Therefore, the computation of the bracketed portion of equation 7 may be performed by the native bilinear filter and a final bilinear weight multiply may be performed in the processor disposed within the pixel shader. The above-noted equations 2-6 may be calculated by a pre-processor, as discussed above, and the values received by the bilinear filter. The method allows for improved higher level bilinear filtering through the effective utilization of both components. In one embodiment, the bilinear weight multiply may thereupon be implemented in the shader code and operated to perform calculations and the bilinear term is generated by the texture fetch unit to produce the bilinear term calculated by the bilinear function. As noted above, the scale factors and the ratios may be determined using a pre-processing technique based on the initial weight values.

Figure 5:
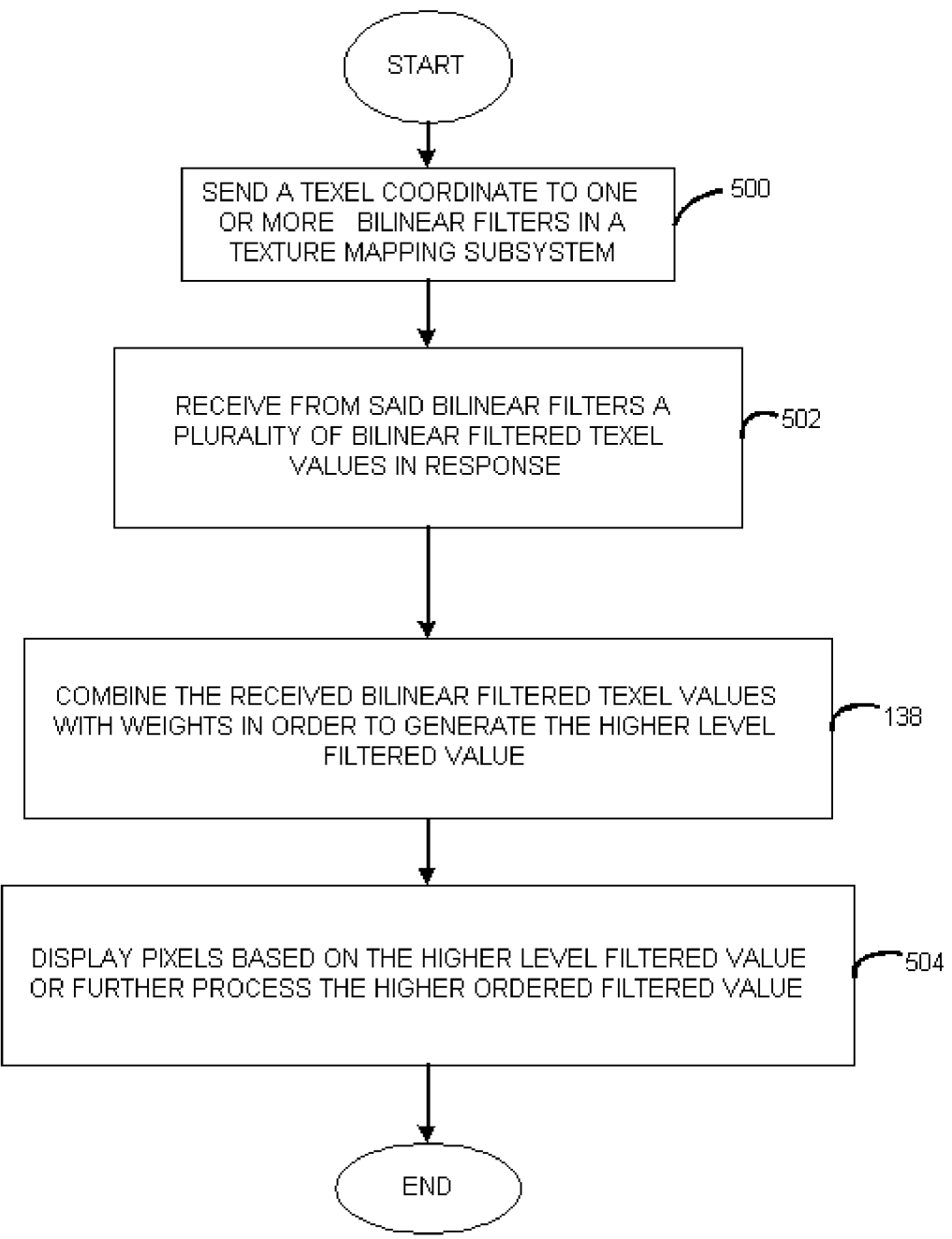
FIG. 5 illustrates a flowchart of a method for higher level filtering in accordance with one embodiment of the invention.
Figure 6:
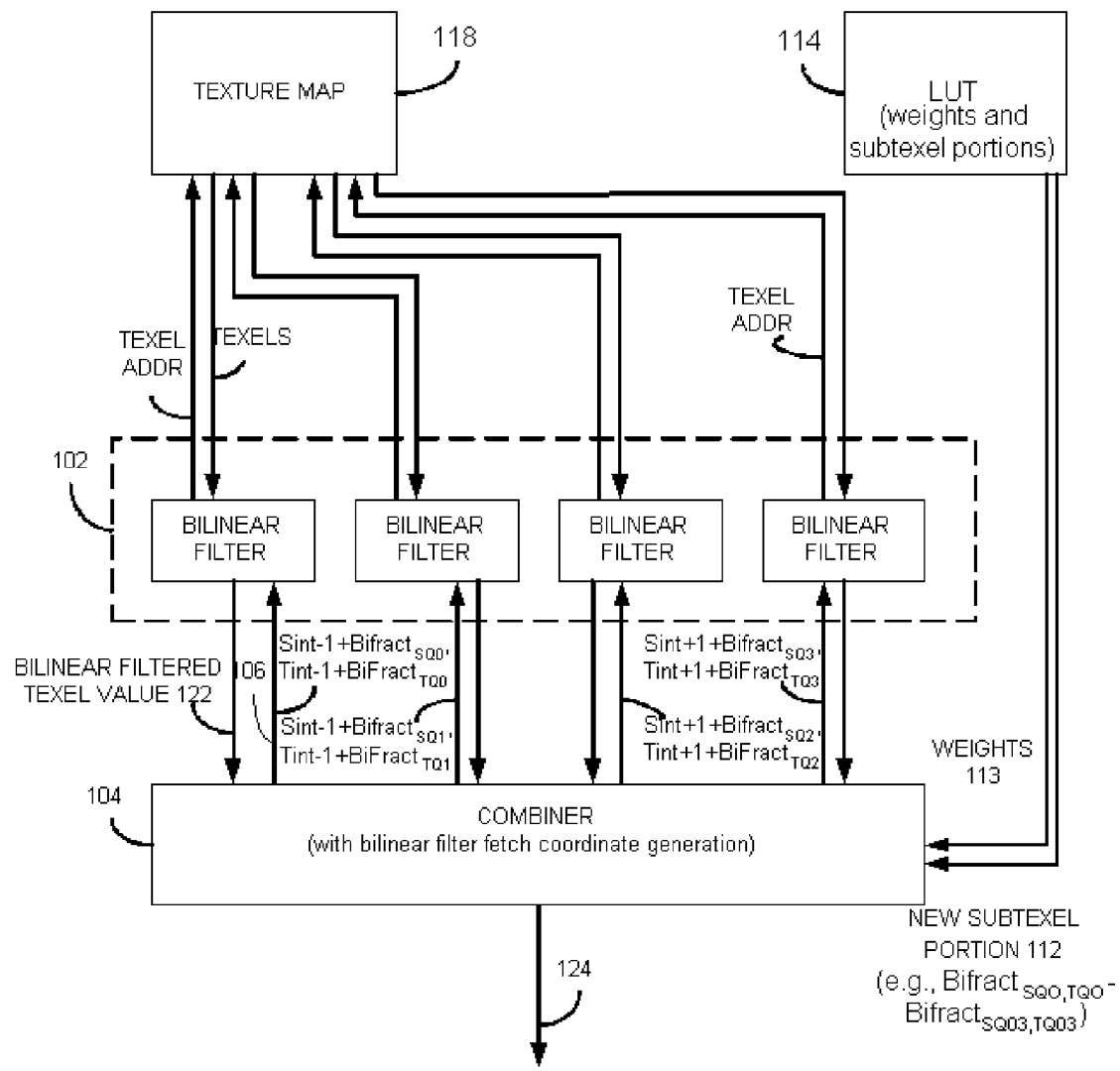
FIG. 6 is a block diagram illustrating one example of graphics processing system in accordance with one embodiment of the invention.

FIG. 6 diagrammatically illustrates one example of system employing a bilinear filter having four parallel filters instead of a system that reuses one bilinear filter and multiple passes through the same filter. Its operation is similar to that described above with respect to FIGS. 2-5.

As recognized by one having ordinary skill in the art, the computations and techniques for data transformation of the present invention, including the above-noted equations, provide an equivalent actual result as the prior art computational techniques. For example, the resultant computation of Equation 7 produces the same result as the prior art computation of summing the multiplications of texels and weights (e.g. W00*p00+W10*p10+W01*p00+W11*p11). However, the present invention provides for improved computation through the effective utilization of existing computation resources and the manipulation of computational terms, such as the generation of Equation 7 above.

As shown in FIG. 5, a method for higher level filtering is illustrated as taken from the perspective of the combiner shown in FIG. 1. However, any suitable structure may carry out the disclosed operations. As shown in block 500, the method includes sending a texel coordinate 106 to one or more bilinear filters 102 in a texture mapping subsystem 103. As shown in block 502, the method includes receiving from the bilinear filter 102, a plurality of bilinear filtered texel values 122 in response to sending the new texel coordinate 106. As shown in block 138, the method includes combining the received bilinear filtered texel values 122 provided by the bilinear filter, with corresponding weights, in order to generate the higher level filtered texel value 124. This may be done, for example, by suitable arithmetic combining logic. As shown in block 504, the higher level filtered texel value may be further processed in a pipeline or by other suitable processing stage or may be displayed as a pixel in an image on a display.

As such, in one embodiment, utilization of the bilinear filter requires a reduced number of weights and uses fewer fetches than pick nearest filtering techniques performed by a shader. For example, in a four by four matrix, the prior art utilizes sixteen (16) weights, wherein the present invention utilizes four weights. A total number of thirteen instructions (7 fetches and 6 ALU shader instructions) are used by the instant method and apparatus for a four by four matrix. These fetches for a 4×4 texel include the Sfract values, the Tfract values and 4 weights which are applied to the output of the bilinear filter such that native hardware is reused multiple times to effectively build up a larger bilinear filter by combining results from multiple passes (i.e., uses) of the native bilinear filter hardware. Pick nearest filtering using shader operations can result in thirty six instructions (16 fetches for the texels, 4 fetches for the weights and 16 ALU operations to determine the higher level filtered value). The present invention may utilize, for example, four bilinear texel fetches rather than 16 pick-nearest fetches of the prior techniques while using the same hardware based bilinear filters as prior art techniques. Also, in another embodiment, for example, four parallel bilinear filters (4 bilinear filter fetches in parallel) could be used instead of re-using the same native filter logic multiple times.

It should be understood that the implementation of other variations and modifications of the invention and its various aspects will be apparent to those of ordinary skill in the art, and that the invention is not limited by the specific embodiments described herein. For example, the combiner 104 may be incorporated into any element within the pixel processing pipeline such that the pixel shader may utilize and generate the proper pixel processing output. It is therefore contemplated to cover by the present invention, any and all modifications, variations, or equivalents that fall within the spirit and scope of the basic underlying principles disclosed and claimed herein.

What is claimed is:

1. Within a graphics processing system that includes a texture mapping subsystem, a higher level filter for image processing comprising:
   one or more bilinear filters, located within the texture mapping subsystem, that are operative to provide one or more bilinear filtered texel values in response to one or more fetch coordinates; and
   a combiner that is operative to provide the one or more fetch coordinates and to provide a higher level filtered texel value in response to the one or more bilinear filtered texel values.

2. The filter of claim 1 wherein the combiner is operative to provide the higher level filtered texel value by weighting the one or more bilinear filtered texel values and summing the weighted one or more bilinear filtered texel values.

3. A method of generating a higher level filtered texel value within a graphics processing system, which system includes a texture mapping subsystem that includes at least one bilinear filter and a combiner, the method comprising:
   sending, via the combiner, a texel coordinate to the at least one bilinear filter;
   receiving from the at least one bilinear filter a plurality of bilinear filtered texel values in response to the texel coordinate; and combining, via the combiner, the received bilinear filtered texel values with weights in order to generate a higher level filtered texel value.

4. A method of generating a higher level filtered texel value within a graphics processing system, the method comprising:
generating a plurality of weights in response to a sub-texel portion of initial texel fetch coordinates;
generating a plurality of new sub-texel portions from the sub-texel portion of the initial texel fetch coordinates;
generating a plurality of new texel portions from a texel portion of the initial texel fetch coordinates;
generating a plurality of new bilinear filter fetch coordinates based on the generated new texel portions and the generated new sub-texel portions;
generating bilinear filtered texel values by performing a plurality of bilinearly filtered texture fetches using the generated bilinear filter fetch coordinates; and
combining the plurality of bilinear filtered texel values and the plurality of generated weights to produce a higher level filtered texel value.

5. The method of claim 4, wherein the weights are based on a monochrome weighting.

6. The method of claim 4 wherein generating a plurality of new sub-texel portions further includes: fetching the new sub-texel portion from a look-up table.

7. The method of claim 4 wherein performing a plurality of bilinearly filtered texture fetches comprises fetching a plurality of texel data from a texture map.

8. The method of claim 4 wherein combining the plurality of bilinear filtered texel values and the plurality of weights includes summing the products of each of a plurality of bilinear filtered texel values with corresponding weights.

9. The method of claim 4 wherein the combining the plurality of bilinear filtered texel values and the plurality of weights is performed by a shader.

10. A method of generating a higher level filtered texel value within a graphics processing system, the method comprising:
generating a plurality of weights from a first texture map based on an initial sub-texel coordinate;
generating a plurality of sub-texel portions based on the initial sub-texel coordinate;
generating a plurality of bilinear filter fetch coordinates based on the generated sub pixel sub-texel portions and the initial texel fetch coordinate;
fetching a plurality of texel data based on the bilinear filter fetch coordinates from a second texture map; and
combining the plurality of texel data and the plurality of generated weights.

11. The method of claim 10 wherein combining the plurality of texel data and the plurality of generated weights includes summing the products of each of the plurality of texel data with corresponding generated weights.

12. The method of claim 10 wherein combining the plurality of texel data and the plurality of generated weights is performed by a shader.

13. A method of generating a higher level filtered texel value within a graphics processing system, the method comprising:
receiving at least one initial pixel coordinate;
generating a plurality of weights in response to a sub-pixel portion of said initial pixel coordinates;
generating a plurality of new sub-pixel portions from the sub-pixel portion of the initial pixel coordinates;
generating a plurality of new pixel portions from the pixel portion of the initial pixel coordinates;
generating a plurality of new bilinear filter fetch coordinates based on the generated new pixel portions and the generated new sub-pixel portions;
generating bilinear filtered pixel values by performing a plurality of bilinearly filtered pixel operations using the generated bilinear filter coordinates; and
combining the plurality of bilinear filtered pixel values and the plurality of generated weights to produce a higher level filtered pixel value.

14. The method of claim 13 wherein the weights are based on a monochrome weighting.

15. The method of claim 13 wherein generating a plurality of new sub-pixel portions further includes: fetching the new sub-pixel portion from a look-up table.

16. The method of claim 13 wherein performing a plurality of bilinearly filtered texture fetches comprises fetching a plurality of pixel data.

17. The method of claim 13 wherein combining the plurality of bilinear filtered pixel values and the plurality of weights includes summing the products of each of a plurality of bilinear filtered pixel values with corresponding weights.

* * * * *